July 6, 1965  W. S. MILLER  3,192,705
HEAT OPERATED ENGINE
Filed Aug. 31, 1961  4 Sheets-Sheet 2
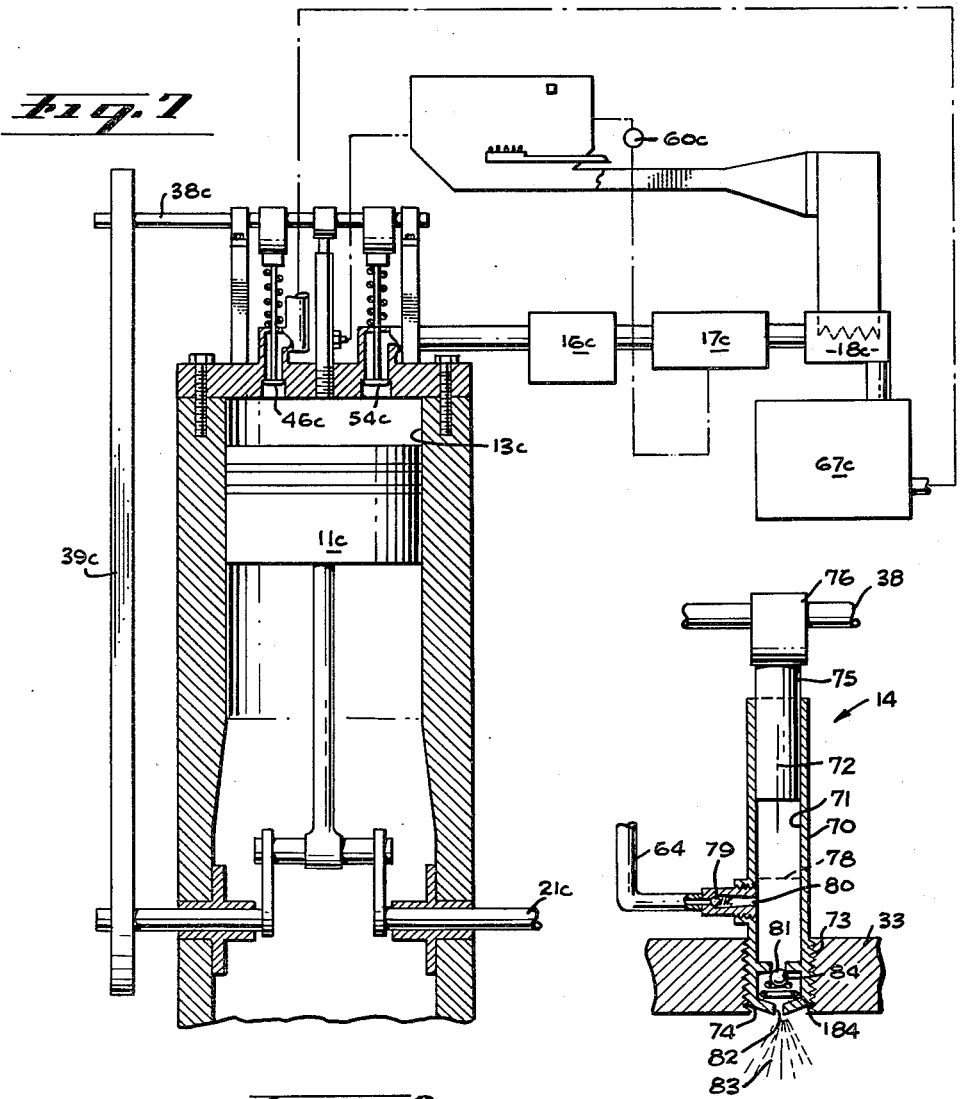
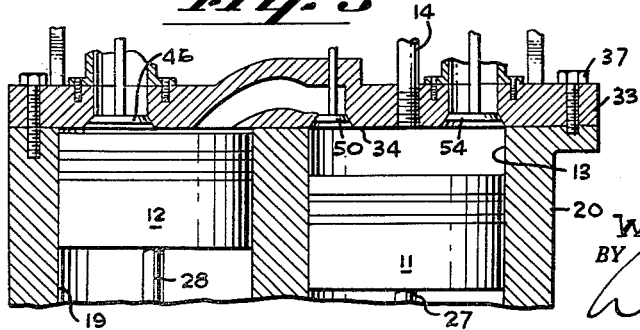
INVENTOR.
WENDELL S. MILLER
BY William P. Green
ATTORNEY

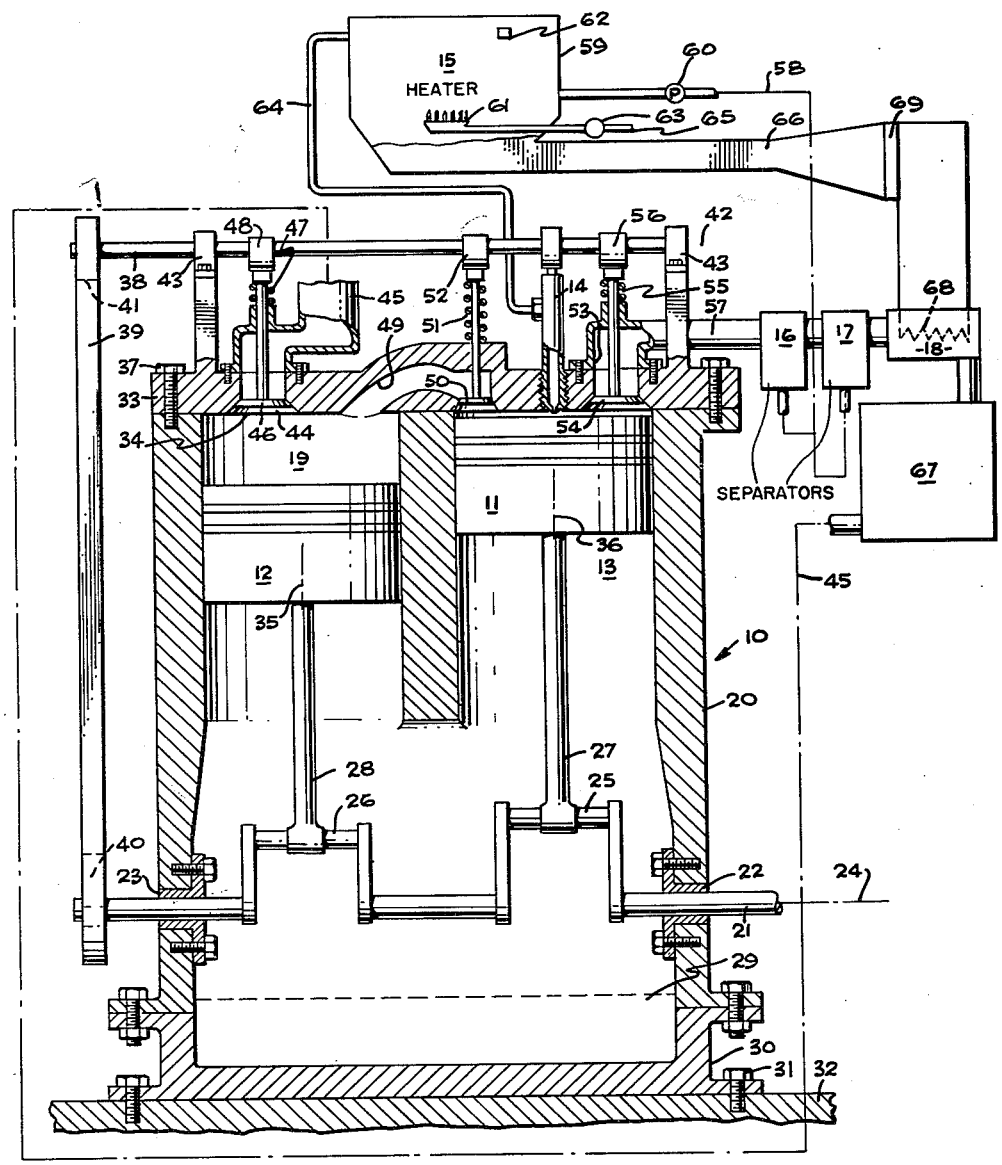

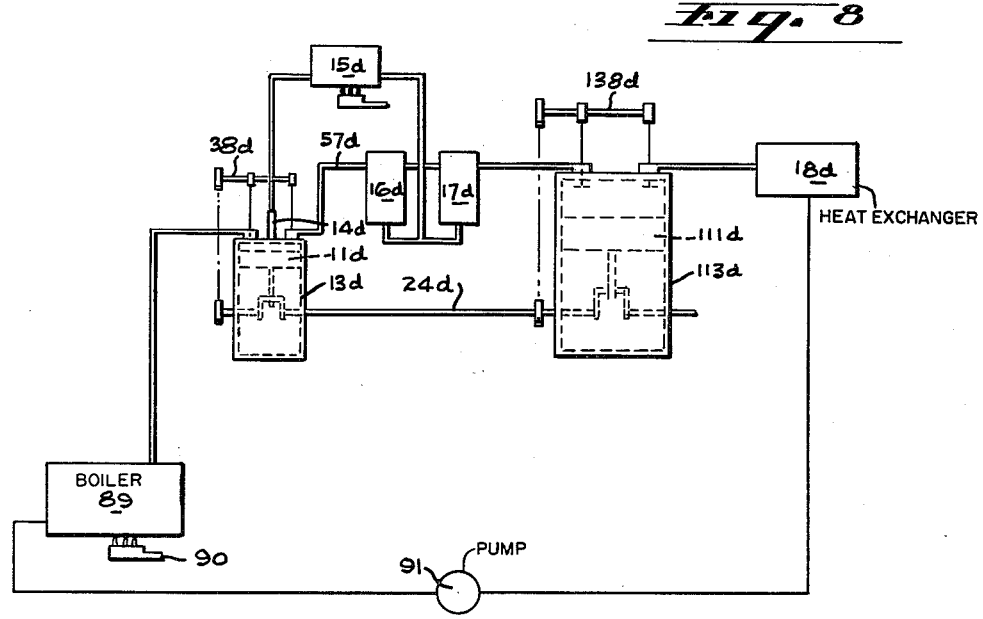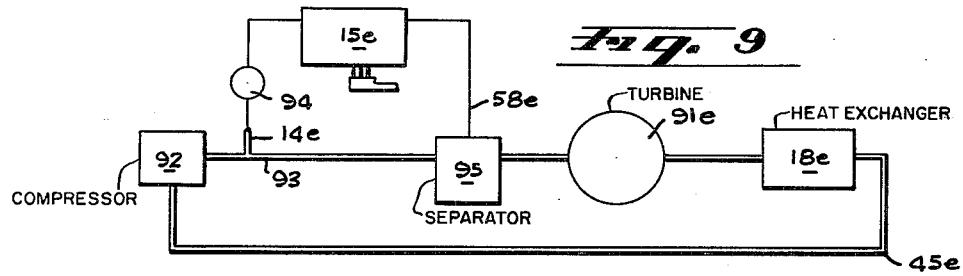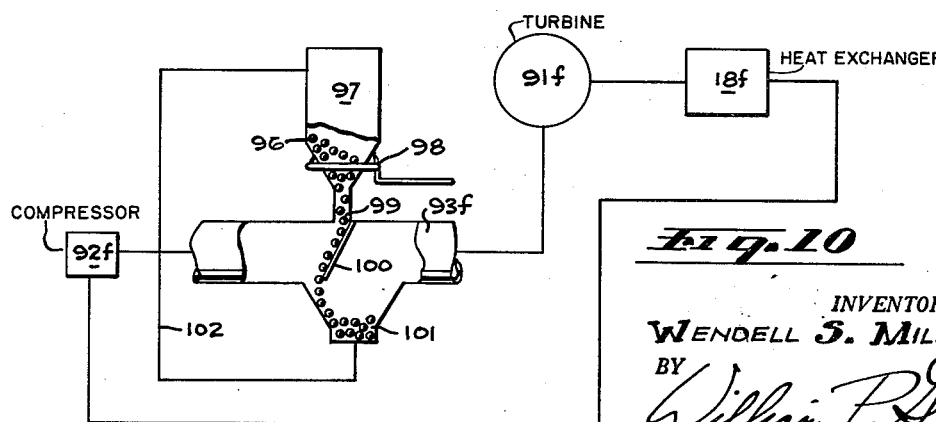

3,192,705
HEAT OPERATED ENGINE
Wendell S. Miller, 1341 Comstock Ave.,
Los Angeles, Calif.
Filed Aug. 31, 1961, Ser. No. 135,322
15 Claims. (Cl. 60—27)

This invention relates to an improved type of fluid operated engine having a unique thermodynamic cycle of operation differing substantially from all prior cycles with which I am familiar.

Conventional engines fall into several different general classes, having various basically different thermodynamic cycles, e.g. the Otto cycle, the Diesel cycle, etc. Unfortunately, each of these conventional or known cycles has had at least one decided disadvantage in actual operation; and none of these cycles has attained anything like the operational efficiency which would be desired from the ideal engine. In each case, some inherent characteristic of the particular cycle or engine requires necessarily that the efficiency be relatively low, and/or that the horsepower output per pound of engine be low, or that one or more other disadvantages be accepted along with whatever advantages may be attained by the cycle in question.

The general object of the present invention is to provide a new type of operating cycle which is, by its very nature, considerably more efficient in operation than any of the conventional cycles previously proposed. A further object is to provide an engine having this desired high efficiency, and in addition having a much higher horsepower output per pound of engine than is attained in prior arrangements. In addition, it is an object of the invention to so design the engine as to be relatively silent in operation as compared with internal combustion engines.

Engines embodying the invention are very flexible as to the different types of heat sources which may be employed. For example, they may utilize heat sources which are relatively remote from the location of the engine, or may employ fuels of low or variable quality. More particularly, an engine constructed in accordance with the invention may be driven by solar energy, waste heat, refuse incineration, wood fires, or other heat sources whose quality or character are not such as to enable their use in conventional engines. Also, the engine is adapted to be driven, if desired, by a plurality of different heat sources at different temperatures.

Engines embodying the invention are of the external combustion type, that is, the primary heat source is outside of the cylinder or other working mechanism. In this connection, a particular very important object of the invention is to provide an improved arrangement for conducting heat from such an external heat source to the working fluid of the engine.

To attain these objects and advantages, I utilize a unique thermodynamic cycle in which the expansion of the gas which drives the engine is attained by introducing into the gas a heated substance which is in condensed phase, i.e. either liquid or solid, the substance desirably being a liquid. The heat of this substance is conducted to the gas, tending to increase the pressure of or expand the gas, with the energy of the gas then being applied to the engine as the gas does expand and drive a piston or rotor. Preferably, the liquid or other heat transfer substance is injected into the cylinder in finely atomized form, to contact the gas intimately, in a manner conducting the heat to the gas in a minimum interval of time. The gas is desirably in highly compressed form before injection of the heat transfer substance into the cylinder, with the result that a very great driving force can be exerted against the piston or rotor. This force and the output of the engine, can be varied in convenient manner by merely varying the amount of heat transfer substance which is injected.

The invention may be applied to either a rotary engine or reciprocating engine, and in the case of the latter may be applied to either a two stroke cycle or four stroke cycle engine. In the case of a two stroke cycle engine, the initial compression of the working gas prior to injection of the heat transfer substance may be attained by means of an auxiliary piston acting to compress the gas and then force it at high pressure into the working cylinder. In a four stroke cycle engine, the compression stroke may be effected by the power piston itself.

After the gas has been heated by a liquid or other heat transfer substance, these two substances may be separated from one another, following which the gas may be cooled, the heat transfer substance be reheated, and both be recirculated to the inlet side of the engine. The working gas may be any of various different gases, with argon being presently preferred for many types of installations. In other situations, steam is highly desirable for use as the working gas, since steam may be condensed and very easily recirculated in liquid form to the inlet side of the engine.

In the optimum arrangement for a reciprocating engine, the heat transfer liquid is injected into the cylinder at a series of different times during each power stroke, with the temperature of the liquid which is injected at these different times becoming progressively lower during each individual stroke. For this purpose, I may utilize a series of injectors delivering liquid into the cylinder from a series of different heaters; or may employ any other equivalent system capable of injecting different temperature liquids sequentially.

The above and other features and objects of the present invention will be better understood from the following detailed description of the typical embodiments illustrated in the accompanying drawings in which:

FIG. 1 is a vertical section through an engine constructed in accordance with the invention, with certain portions of the auxiliary apparatus being illustrated diagrammatically;

FIG. 2 is an enlarged vertical section through the liquid injector of the FIG. 1 unit;

FIG. 3 is a fragmentary view similar to FIG. 1, but showing the pistons in somewhat more advanced positions;

FIGS. 4a and 4b are two Pressure-Volume diagrams representing two possible thermodynamic cycles of the FIG. 1 engine;

FIG. 7 is a view similar to FIG. 1, but showing the present principle applied to a four stroke cycle engine; and FIGS. 8, 9 and 10 are diagrammatic representations of three additional forms of the invention.

Figure 6:
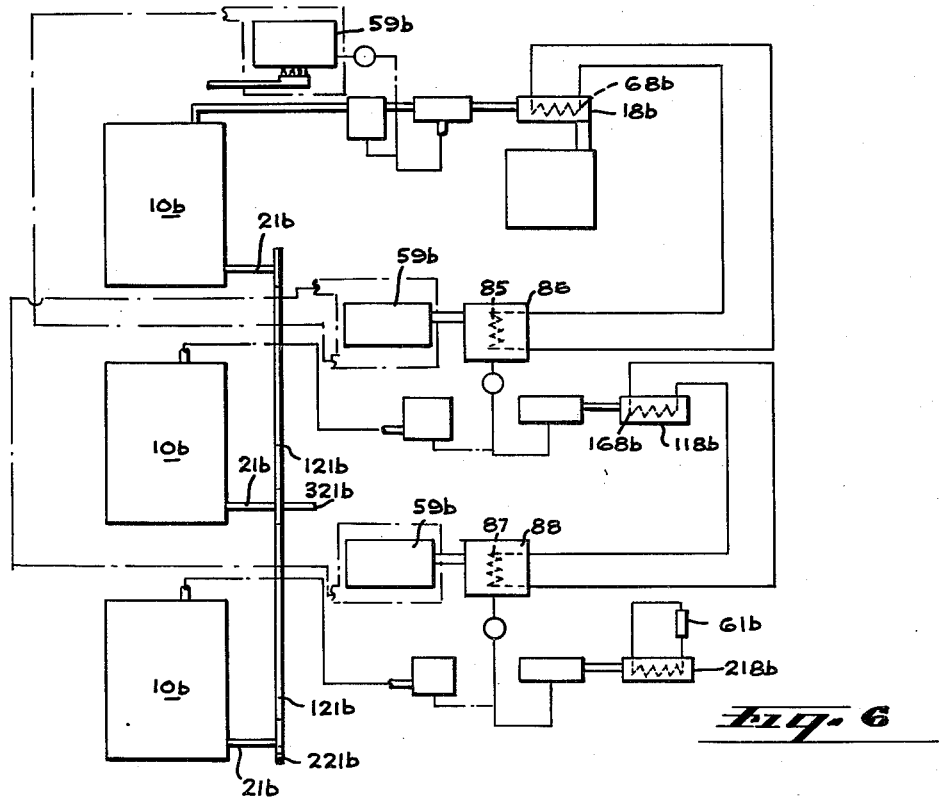
FIG. 6 is a diagrammatic representation of another form of the invention.

In FIG. 1, I have represented at 10 a two stroke cycle reciprocating engine embodying the invention, having a power piston 11 and compression piston 12. The heat transfer liquid, for heating the compressed gases contained within main cylinder 13, is injected into that cylinder by means of an injector 14, to which the heated liquid flows from a heater 15. This liquid is ultimately separated from the gas by means of two separator units represented at 16 and 17, with the cleaned gas then being cooled in a heat exchanger 18, for ultimate return to compression cylinder 19.

The cylinders 13 and 19 are illustrated as taking the form of parallel vertical cylindrical bores within an engine block 20. Crankshaft 21 is mounted by bearings 22 and 23 for rotation about a horizontal axis 24, and has two crank throws 25 and 26 to which pistons 11 and 12 are connected by conventional piston rods 27 and 28 respectively. The apparatus may be lubricated by a body of oil 29 contained within lower crankcase portion 30 of the engine block structure, with section 30 being bolted at 31 to a mounting structure 32.

The upper ends of cylinders 13 and 19 are closed by a cylinder head part 33, whose under surface 34 extends horizontally, and transversely of axes 35 and 36 of the cylinders, except insofar as surface 34 is interrupted to provide the various fluid passages and injector reception opening later to be described. Head structure 33 is secured to engine block 20 by bolts 37, and is of course suitably gasketed with respect to the engine block to prevent leakage of fluid into or out of the cylinders except through the intake and discharge passages.

The valves and injector may be actuated in timed relation with respect to pistons 11 and 12 by means of an overhead camshaft 38, turning about an axis which is parallel to main axis 24. Camshaft 38 may be driven by crankshaft 21 by means of a timing chain 39, engaging sprocket wheels 40 and 41 on shafts 21 and 38 respectively. The camshaft is suitably mounted for rotation about its axis 42, as by means of bearings 43 secured to the upper side of cylinder head 33.

Gas to be compressed within cylinder 19 is typically taken into that cylinder through a vertical passage 44 formed in head 33, which passage communicates with an intake line 45. The admission of gas through passage 44 is controlled by an intake valve 46, which may be yieldingly urged upwardly by a coil spring represented at 47, and is actuated downwardly by an associated cam 48 on camshaft 38. After compression within cylinder 19, the gas flows through a passage 49 in head 33 into power cylinder 13, under the control of a valve 50 urged upwardly by spring 51 and actuated by cam 52. Following the power stroke, the gas and contained heating liquid are discharged from cylinder 13 through a head passage 53, under the control of valve 54 which is urged upwardly by spring 55 and is actuated downwardly by cam 56.

The intimately mixed gas and heating liquid flow from outlet 53 into a discharge line 57, to be separated from one another by one or more separator devices such as those represented at 16 and 17 in FIG. 1. Unit 16 may typically be a vortex type separator capable of separating most of the liquid from the gases, with unit 17 being an electrostatic separator acting to then remove the final traces of aerosol entrained in the gas. The separated liquid flows through line 58 to container 59 within heater 15, with the flow of liquid typically being induced by a pump represented at 60. A burner 61 heats the liquid within container 59, preferably under the control of a thermostat 62 and controlled fuel regulating valve 63, in a manner maintaining a uniform liquid discharge temperature in line 64 leading to injector 14. Oil, gas, or other fuel may be fed to burner 61 through a fuel inlet line 65, with air being supplied to the burner through an inlet line 66. It will of course be understood that other means for heating the liquid within container 59 may be substituted for the burner arrangement illustrated at 61. Pump 60 acts to maintain a sufficient pressure in line 64 to effectively force the liquid into injector 14 on the intake stroke thereof.

The cleaned gas discharging from separator 17 flows through a heat exchanger or cooler 18 acting to cool the gas prior to its delivery into accumulator tank 67. The previously mentioned line 45 leads the gas ultimately from tank 67 back to cylinder 19 for recompression therein. The cooling coils 68 within heat exchanger 18 may be connected to a radiator or heat exchanger element 69 placed in the air inlet passage 66 leading to heater 15, to preheat the air delivered to the burner.

Referring now to FIG. 2, which illustrates in greater detail the injector 14, this injector in the form illustrated in the figure includes a vertically extending rigid high pressure resistant body 70, containing a vertical bore 71 centered about an axis 72. The lower end of body 70 is externally threaded at 73, for connection into mating threads formed within a bore 74 in head 33. An externally cylindrical plunger 75 is vertically slidable within bore 71 in the injector body, and is actuated downwardly in timed relation to the operation of the pistons by cam 76 on camshaft 38. The plunger is normally urged upwardly by the pressure of the liquid from line 64, and is actuated downwardly against that pressure by cam 76. The lowermost position of the lower end of plunger 75 is represented at 78 in FIG. 2.

The liquid from line 64 passes through a check valve 79, adapted to permit the flow of fluid into body 70 through aperture 80, but effectively preventing a reverse flow of liquid. This intake of liquid into body 70 is effected during the upstroke of plunger 75. On the downstroke of this plunger, the metered charge of liquid taken into body 70 is forced downwardly therefrom past another check valve 81, to emit from the injector through a bottom outlet opening 82 in the form of a finely atomized spray 83 capable of mixing intimately with the gas within cylinder 13. As will be apparent, check valve 81 permits the discussed downward discharge of liquid from the injector, but prevents a reverse or upward flow of fluid into the injector, by virtue of engagement of the ball of check valve 81 with seat 84. This check valve may be spring urged to closed position, by a spring 184, having a force sufficient to prevent opening of the valve except on the downstroke of plunger 72, i.e. the spring prevents opening of the valve solely by the pressure from pump 60.

To now describe a cycle of operation of the engine shown in FIGS. 1 to 3, assume first of all that compression piston 12 is in its uppermost position. As the piston 12 commences its downward movement, valve 46 is opened by cam 48, and gas is therefore drawn into cylinder 19 by piston 12 from accumulation chamber 67. During this intake of gas, valve 50 is closed, to isolate cylinder 19 from cylinder 13. When piston 12 reaches the lower end of its stroke, valve 46 closes, so that piston 12 may function to compress the gas in cylinder 19 as piston 12 moves upwardly to the position represented in FIG. 1. At that position, valve 50 opens (with valve 54 being in closed condition), and piston 12 is thus free to force the compressed gas from cylinder 19 through passage 49 into cylinder 13. The two crank throws 25 and 26 are so constructed that piston 12 lags piston 11 slightly, as shown in FIGS. 1 and 3 (say about 15°). As a result, when piston 12 is in its FIG. 1 position, at which valve 50 opens, piston 11 is in its uppermost position in which the effective volume of cylinder 13 is substantially zero. From this point, piston 11 commences to move downwardly while piston 12 moves upwardly, so that the compressed gases are forced into cylinder 13 by the time the pistons reach their FIG. 3 positions. In this FIG. 3 condition, piston 12 is in its uppermost zero volume position, and piston 11 is spaced downwardly a substantial distance from top wall 34 of the associated cylinder. At this point, valve 50 closes, and valve 46 opens so that piston 12 may commence another gas intake stroke.

When piston 11 reaches the FIG. 3 position, and after valve 50 is closed, cam 76 actuates injector 14 to force a metered charge of high temperature liquid from tank 59 into cylinder 13, in finely atomized spray form. This high temperature liquid mixes very intimately with the compressed gas within cylinder 13, to impart heat thereto (since the injected liquid is preferably at a temperature substantially above that of the compressed gases). The heat thus imparted to the compressed gases tends to increase their pressure and cause expansion thereof. As a result, piston 11 is forced downwardly by the rapidly expanding gases, to apply a driving torque to crankshaft 21. When piston 11 reaches its lowermost position, valve 54 opens, while valve 50 remains closed, so that the upstroke of the piston forces the intermixed gas and liquid mist or aerosol from cylinder 11 through discharge line 57 and into separators 16 and 17. These separators remove the liquid from the gas, so that the liquid may be recirculated to heater 15 through line 58, and the gas may be passed through heat exchanger 18 to accumulator tank 67, for ultimate recirculation to compression cylinder 19.

It is noted that both the gas and liquid may be continuously recirculated along closed or endless paths in the present engine, with no discharge of either of these fluids to the atmosphere. The fuel utilized in the system may be an extremely low quality fuel, since it is not required to burn within the cylinders of the engine in the manner of an internal combustion engine. One advantage of the engine is that the power cylinder 13 and its piston 11 may at all times be maintained at a much higher temperature than is possible in most other engines, with this temperature serving of itself to enhance the expansion of the gas within cylinder 13. The compression cylinder 19, on the other hand, may be operated at a considerably lower temperature than cylinder 13.

The working gas employed in the system may be any gas capable of withstanding the temperature and pressure conditions encountered in the engine without deterioration, and without oxidation, corrosion, or other effect on any of the contacted parts of the apparatus. The working gas is preferably a monatomic gas, to have a very low specific heat, the gas desirably being argon in the optimum situation. The heat transfer liquid injected through unit 14 should be a substance capable of remaining in liquid form under all of the temperature and pressure conditions encountered, without any substantial volatility, and capable of withstanding the high temperatures encountered (preferably up to about 1100° F.) without degradation. A highly desirable substance for this purpose is a eutectic mixture of lead and tin, or lead, tin and bismuth, or lead, tin, bismuth and antimony. For somewhat lower temperature, I may employ a eutectic mixture of diphenyl with diphenyl oxide (e.g. "Dowtherm A" as sold by Dow Chemical Company), or one of the various commercially available polysiloxane heat transfer liquids. It is also possible to use such liquids as a heavy mineral oil, for example white mineral oil, or perhaps mercury, though the latter has certain disadvantages in use.

FIG. 4a represents a typical pressure-volume curve of an engine such as that shown in FIGS. 1 to 3, (the FIG. 4a curve assuming that the liquid is injected into the cylinder at a temperature substantially the same as that of the compressed gas). In this curve, the compression stroke of piston 12 commences at point a and continues to point b. This is an adiabatic compression line. At point b, the gas is forced from cylinder 19 to cylinder 13 (by actuation of the pistons from the FIG. 1 positions to the FIG. 3 positions), without substantial change in either pressure or volume of the gas. The heated liquid may be injected into the gas at point b, and the line from point b to point c in FIG. 4a then represents the resulting expansion as piston 11 moves downwardly from the FIG. 3 position to the bottom of its stroke.

As mentioned above, FIG. 4a represents the case where the temperature of the injected liquid is the same as the temperature of the gas after adiabatic compression. In this case, the heat transfer liquid in effect raises the heat capacity of the working fluid without changing its temperature, and the expansion from b to c follows the polytropic expansion law applicable to the adiabatic expansion of a fluid having the constant pressure and constant volume heat capacities of the composite working fluid in the cylinder. If the heat capacity of the injected liquid greatly exceeds that of the compressed gas, the expansion from b to c will be very nearly isothermal, and the heat transfer liquid will be subsequently removed at point c (by the separation apparatus 16 and/or 17) and returned to the heater at very nearly the maximum or introduction temperature. The gas, following the separation process at c, will in this case be near the maximum temperature, and may be used to power another motive element such as a gas turbine, or may be cooled in a heat exchanger such as that shown at 68, at a sacrifice in thermal efficiency. If the heat capacity of the fluid injected at b is comparable in magnitude to that of the compressed gas, the polytropic expansion curve of the composite working fluid from b to c will more closely approximate the adiabatic expansion curve of the gas, and there will be a lower power output from the engine and a lower temperature of return of the working fluid to the heater. The line from point c to point a in FIG. 4a represents constant pressure cooling of the gas in such a heat exchanger.

FIG. 4b represents the pressure-volume diagram which results when the heat transfer liquid is injected at a temperature in excess of the temperature of the compressed gas. In this situation, there preferably is an essentially constant volume heat input from point b to point b'; and from point b' the composite working fluid follows essentially the same cycle as that described in the paragraph above.

The above discussion of FIGS. 1 to 4 has assumed throughout that the heated liquid is injected into cylinder 13 after completion of the intake of the working gas, and therefore after piston 11 has moved downwardly through a substantial portion of its stroke, as to the position of FIG. 3. Such delayed injection of the liquid is desirable if absolute maximum efficiency of the engine is to be attained. In some instances, however, it may be preferred that injection of the liquid be timed to commence at (or nearer) the very top of the piston stroke, rather than at the FIG. 3 position, to thereby increase the portion of the stroke during which the heat of the liquid is effective, even though such an arrangement may decrease somewhat the overall engine efficiency. It is to be understood that the invention contemplates such altered timing of the injection where desired.

Figure 5:
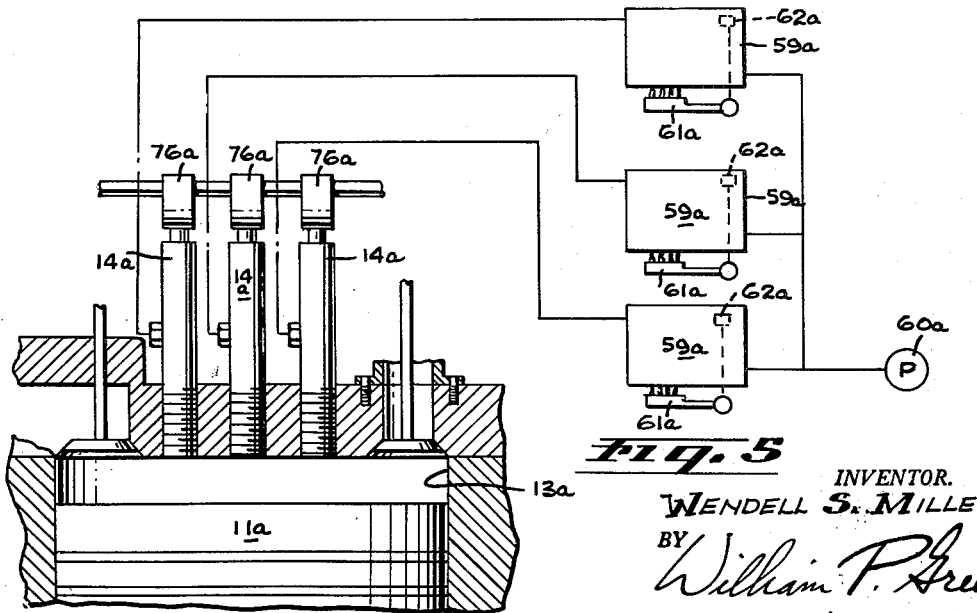
FIG. 5 is an enlarged fragmentary representation of a variational form of the invention.

FIG. 5 shows fragmentarily another form of engine embodying the invention, which may be considered as identical with that of FIGS. 1 to 3 except for the provision of three separate injectors 14a in place of the single injector 14 of FIG. 1, with these injectors receiving heated liquid at three different temperatures from three individual heating tanks 59a heated by burners 61a. Separate thermostats 62a and associated valves maintain the liquid within the three tanks 59a at three predetermined different temperatures. Individual cams 76a actuate the three injectors 14a at different times during the downward stroke of piston 11a. Liquid is forced into all three of the heating tanks 59a by a single pump 60a, corresponding to pump 60 of FIG. 1. In discussing a cycle of operation of the FIG. 5 device, assume that the pistons have reached the FIG. 3 position, and that the first of the cams 76a actuates a first of the injectors 14a at that point, to inject a first metered charge of high temperature liquid into cylinder 13a in the FIG. 3 position. After this injection has been completed, and the piston has moved downwardly through a portion but not all of its downstroke, the second injector 14a opens, to inject a second metered charge of heated liquid into cylinder 13a, at a temperature which is lower than that at which the first charge was injected, but which corresponds to approximately the temperature of the gas and liquid mixture in the cylinder at the time of the second injection. Subsequently, after the second charge has been injected, and the piston has moved downwardly still farther, but still not to the bottom of its stroke (and with resultant further cooling of the gas and liquid mixture within cylinder 13), the third cam 76a actuates the third injector 14a to inject a third metered charge of liquid into cylinder 13a. This charge is at a temperature lower than either of the other two, and corresponding approximately to the temperature at that time of the gas-liquid mixture in the cylinder. Thus, these sequential injections of a plurality of charges of heated liquid, progressively decreasing in temperature, act to assure continuance of the expansion of the gases through the entire down stroke of piston 11a, to thereby increase the horsepower output of the engine.

FIG. 6 shows somewhat diagrammatically a compound arrangement including three engine systems 10b which are essentially the same as engine 10 of FIG. 6, except with respect to the particulars discussed below. The output shafts 21b of the three engines are all connected together as by chains 121b engaging sprocket wheels 221b, to have a common output 321b. In FIG. 6, heat exchanger 18b of the upper engine assembly has its cooling coil 68b connected to a coil 85 of a heat exchanger 86 which acts to preheat the liquid flowing into heating tank 59b of the second engine. Similarly, the cooling coil 168b of heat exchanger 118b of the second engine is connected to preheating coil 87 of heat exchanger 88, for preheating the liquid flowing to heater tank 59b of the third engine. The heat exchanger 218b of the third engine may be connected to a radiator 61b as in the first form of the invention. Thus, in FIG. 6, the heat taken from the working gas, in cooling it after separation of the heat transfer liquid therefrom, is utilized for preheating the liquid of the next successive engine. Also, it is preferred that the heat of the stack gases exhausted from the hottest one of the liquid heaters 59b be conducted to the next successive one of the heaters 59b, and then after heating the liquid at that location be conducted to and used to heat the liquid in the bottom heater (at successively lower temperatures) as represented in broken lines in FIG. 6. This arrangement enables a single set of burners to heat the liquid for all three engines, at three progressively lower temperatures, and with maximum use of the total heat energy.

FIG. 7 shows an arrangement which differs from the FIG. 1 engine system in that there is only one piston (11c) in FIG. 7, and that piston has a four stroke cycle type of operation, to serve both as a compression piston and a working piston. Intake and discharge valves 46c and 54c are actuated by camshaft 38c, as is injector 14c. The separators 16c and 17c, heat exchanger 18c, accumulator tank 67c, heater 15c, pump 60c and timing chain 39c may all be the same as the corresponding parts of FIG. 1.

As piston 11c of FIG. 7 commences a first down stroke of each cycle of operation, valve 46c is open and valve 54c is closed, so that argon gas or other working gas is taken in past intake valve 46c into cylinder 13c. During the next successive upstroke, both valves are closed, and the gas is compressed within the cylinder. As the piston then commences a second down stroke, injector 14c acts to force finely atomized heated liquid into the cylinder, to heat the compressed gas and cause expansion thereof in the same manner discussed in connection with the first form of the invention. This expansion forces piston 11c downwardly to impart torque to crankshaft 21c. On the next successive upstroke, piston 11c forces the gas and contained liquid outwardly past open valve 54c, following which the gas and liquid are separated, the gas is cooled, and both are recirculated to the engine as in FIG. 1.

FIG. 8 represents another form of the invention, in which the basic novelty of the invention is applied to a steam engine. The apparatus of FIG. 8 includes two cylinders 13d and 113d, containing steam driven pistons 11d and 111d, respectively. These pistons may be connected to a common output shaft 24d. Steam is supplied to the inlet of cylinder 13d, from a boiler 89, heated by a burner 90. After the inlet valve to cylinder 13d has been closed, a heated liquid corresponding to that injected through injector 14 of FIG. 1 is fed into cylinder 13d of FIG. 8 through an injector 14d, which introduces the liquid in a finely atomized spray form. The steam and high temperature liquid leave cylinder 13d through an outlet line 57d, which delivers the steam and liquid to separators 16d and 17d. The heating liquid is separated from the steam in these devices, and then is returned to a heater 15d, within which the temperature of the liquid is raised before recirculation of the liquid to injector 14d. The steam discharging from separator 17d flows into the inlet of the second cylinder 113d, to drive the piston therein, and then discharge from the outlet of piston 113d to cooler 18d. The steam is cooled substantially isothermally within heat exchanger 18d, being condensed to a liquid within that heat exchanger, and is then returned by feed water pump 91 to boiler 89.

The admission of steam into the two cylinders, and discharge of steam from the cylinders, is controlled by valves actuated by cam shafts 38d and 138d, which are of course driven in timed relation with the operation of the pistons. In view of the fact that the working fluid is steam, there is obviously no necessity for initial compression of this fluid before the power stroke of piston 11d (or piston 111d). On each down stroke of each of these pistons, steam is admitted by the intake valve into the corresponding cylinder, to force the piston downwardly. Injector 14d feeds high temperature liquid into the steam near or at the beginning of the piston down stroke, and during the continuance of that down stroke if desired, to increase the driving force of the steam in the manner previously discussed in connection with the other forms of the invention. On each upstroke of each of the pistons, the steam and contained liquid is forced from the associated cylinder, in preparation for the next successive power down stroke. Thus, a power stroke is obtained for each two strokes of the piston.

One advantage of the arrangement of FIG. 8 resides in the fact that the working fluid may be recirculated to the intake side of the system very easily, and with the expenditure of a minimum of work, by feed pump 91. At the time of its passage through pump 91, the working fluid is in liquid form (water), and therefore may be recirculated much more easily than can a substance in gaseous form. Any losses involved in recirculation of the water through pump 91 are substantially negligible as compared with the output of the overall system, and have practically no effect on the overall efficiency of the system.

Because the FIG. 8 arrangement does not rely wholly on the energy supplied to the steam within boiler 89 for driving the pistons, but instead adds energy to the steam by injection of liquid through injector 14d, it is not necessary that the boiler 89 be a high pressure type boiler. Rather, this may be a low pressure boiler, discharging the steam at a fairly low temperature and pressure, say for example about 328° F. and 100 pounds per square inch pressure.

FIG. 9 illustrates an application of the principle of the invention to a rotary type engine, instead of a reciprocating engine. In FIG. 9, I have represented at 91e a turbine which is to be driven by a working gas, e.g. argon, delivered under pressure to the turbine by a compressor 92. A heater 15e corresponds to heater 15 of FIG. 1, and delivers a high temperature liquid such as that discussed in conjunction with the FIG. 1 arrangement, for delivery through an atomizing type injector 14e into line 93 leading to the turbine. A pump 94 may be provided for forcing the liquid in atomized form from injector 14e into the main gas stream. This liquid is desirably at a temperature well above that of the compressed gas, and acts to heat the gas before the liquid is separated from the gas in a separator 95. From this device, the liquid is recirculated through line 58e to heater 15e for reheating. The gas flows from the separator into turbine 91e, to drive the turbine, and is then cooled in heat exchanger 18e, before being returned through line 45e to compressor 92.

The system of FIG. 10 may be considered as the same as that of FIG. 9, except as to the manner in which the gas is heated between compressor 92f and turbine 91f. In FIG. 10, the heat transfer substance, which is utilized for supplying heat to the working gas, is in the form of a solid rather than liquid, and more particularly takes the form of a large number of metal balls 96, typically formed of steel or the like. These balls 96 are contained within a hopper 97, and are raised to high temperature within that hopper by means of a burner 98, which may be annular as shown. The burner heats the balls as they pass downwardly along the lower inclined wall of the hopper and toward an opening 99 through which the heated balls fall by gravity into tube 93f leading from compressor 92f to turbine 91f. Within tube 93f, the balls pass downwardly along the left side of a screen 100, of sufficiently fine mesh to prevent movement of the balls therethrough, and at the bottom of the screen the balls fall downwardly into a collection well 101 from which they may be returned in any suitable manner through a line 102 to the upper end of hopper 97. This return of the balls through line 102 may for example be effected by means of an air-lift, screw conveyor, or any other arrangement capable of displacing the balls along the path indicated. The gas, after being heated by the balls within conduit 93f, flows to turbine 91f to drive it, is then cooled within the heat exchanger 18f, and returned to compresser 92f.

I claim:

1. A reciprocating engine including a cylinder and contained piston to be driven relative to one another by expansion of a gas within the cylinder, means for introducing said gas into the cylinder, means for heating a liquid, and means for injecting said heated liquid into said gas at a plurality of different progressively decreasing temperatures and at a plurality of different piston positions respectively during expansion of said gas in the cylinder, whereby said heated liquid induces expansion of the gas and drives the piston and cylinder relative to one another by energy derived from the heat of the liquid.

2. A reciprocating engine including a cylinder and contained piston to be driven relative to one another by expansion of a gas within the cylinder, means for introducing said gas into the cylinder, means for heating a liquid, means for injecting said heated liquid into said gas at a location to induce expansion of the gas and drive said piston and cylinder relative to one another by energy derived from the heat of the liquid, means for recovering said liquid from the gas after said expansion thereof, a second cylinder, a second piston reciprocable relative to and within said second cylinder by gas expansion, heat exchanger means for heating additional liquid by heat from gas which has expanded in the first cylinder, and means for then injecting said heated additional liquid into said second cylinder to expand gas therein and drive said second piston relative to said second cylinder.

3. An engine including a cylinder, a piston reciprocable relative to and within said cylinder and to be driven relative to the cylinder by expansion of a gas therein, an inlet for introducing said gas into the cylinder, an inlet valve adapted to open and close to control the admission of said gas into the cylinder, a heater for heating a liquid externally of said cylinder, an injector operable to inject said heated liquid in atomized form into said cylinder at a location beyond said inlet valve in the direction of flow of said gas and separately from said gas and into intimate mixture therewith in such timed relation to the movement of the piston relative to the cylinder as to induce expansion of the gas and drive said piston by energy derived from the heat of the liquid, an outlet for discharging said gas and liquid from the cylinder after expansion of the gas, an outlet valve, means for actuating said inlet valve, outlet valve, and injector in timed relation to the reciprocating movement of the piston relative to said cylinder, separating means for removing said liquid from the gas after they are discharged from said cylinder, means for recirculating the separated liquid to said heater, a heat exchanger for cooling said gas after separation of the liquid therefrom, and means for recirculating said gas after being cooled to said inlet.

4. The combination as recited in claim 3, including a second cylinder, a second piston in said second cylinder operating in timed relation to said first piston and acting to compress said gas prior to its introduction into said first cylinder.

5. A reciprocating engine including a cylinder and contained piston to be driven relative to one another by expansion of a gas within the cylinder, means for introducing said gas into the cylinder, an inlet valve operable to open and close and control the admission of said gas to the cylinder, means for heating a substance in condensed phase, and means for injecting said substance in condensed phase into said gas at a location beyond said inlet valve in the direction of gas flow, to induce expansion of the gas and drive said piston relative to the cylinder by energy derived from the heat of said substance, said injecting means including a plurality of different injectors operable to introduce heated substance in condensed phase into said cylinder at a plurality of different progressively decreasing temperatures and at a plurality of different piston positions respectively during expansion of said gas.

6. A reciprocating engine including a cylinder and contained piston to be driven relative to one another by expansion of a gas within the cylinder, means for introducing said gas into the cylinder, and means for injecting heated material in condensed phase into said gas at a plurality of different progressively decreasing temperatures and at a plurality of different piston positions respectively during expansion of said gas in the cylinder, whereby said heated material induces expansion of the gas and drives the piston and cylinder relative to one another by energy derived from the heat of said material.

7. A reciprocating engine including a cylinder and contained piston to be driven relative to one another by expansion of a working fluid within the cylinder, means for introducing said working fluid into the cylinder, said means including an inlet valve operable to open and close and control the admission of said fluid to the cylinder, means for heating a substance in condensed phase, and means operating in timed relation to the operation of said working fluid inlet valve and said piston and cylinder for injecting said substance in condensed phase into said working fluid at a location beyond said inlet valve in the direction of working fluid flow and after said inlet valve has opened to admit said working fluid into the cylinder, to thereby induce expansion of the working fluid and drive said piston relative to the cylinder by energy derived from the heat of said substance.

8. A reciprocating engine including a cylinder and contained piston to be driven relative to one another by expansion of a gas within the cylinder, means for introducing said gas into the cylinder in gaseous form at the time of its introduction, said means including an inlet valve operable to open and then close and thereby admit a controlled charge of said gas to the cylinder, means for heating a substance in condensed phase, and means operating in timed relation to the operation of said gas inlet valve and said piston and cylinder for injecting said substance in condensed phase into said gas at a location beyond said inlet valve in the direction of gas flow and after substantially said entire charge of gas has entered the cylinder, to thereby induce expansion of the gas and drive said piston relative to the cylinder by energy derived from the heat of said substance.

9. A reciprocating engine including a cylinder and contained piston to be driven relative to one another by expansion of a working fluid within the cylinder, means for introducing said working fluid into the cylinder, said means including an inlet valve operable to open and close and control the admission of said working fluid to the cylinder, means for heating a liquid, and means operating in timed relation to the operation of said working fluid inlet valve and said piston and cylinder for injecting said heated liquid into said working fluid at a location beyond said inlet valve in the direction of working fluid flow and after said inlet valve has opened to admit said working fluid into the cylinder, to thereby induce expansion of the working fluid and drive said piston relative to the cylinder by energy derived from the heat of said liquid.

10. A reciprocating engine including a cylinder and contained piston to be driven relative to one another by expansion of a working fluid within the cylinder, means for introducing said working fluid into the cylinder, said means including an inlet valve operable to open and close and control the admission of said fluid to the cylinder, means for heating a substance in condensed phase, means operating in timed relation to the operation of said working fluid inlet valve and said piston and cylinder for injecting said substance in condensed phase into said working fluid at a location beyond said inlet valve in the direction of working fluid flow and after said inlet valve has opened to admit said working fluid into the cylinder, to thereby induce expansion of the working fluid and drive said piston relative to the cylinder by energy derived from the heat of said substance, and means forming a closed circuit for recovering the working fluid after said expansion thereof and recycling it back to said cylinder.

11. A reciprocating engine including a cylinder and contained piston to be driven relative to one another by expansion of a gas within the cylinder, means for introducing said gas into the cylinder, said means including an inlet valve operable to open and then close and thereby admit a controlled charge of gas to the cylinder, means for heating a liquid, and means operating in timed relation to the operation of said gas inlet valve and said piston and cylinder for injecting said heated liquid into said gas in finely atomized form and at a location beyond said inlet valve in the direction of gas flow and after substantially said entire charge of gas has entered the cylinder, to thereby induce expansion of the gas and drive said piston relative to the cylinder by energy derived from the heat of said liquid.

12. A reciprocating engine including a cylinder and contained piston to be driven relative to one another by expansion of a working fluid within the cylinder, means for introducing said working fluid into the cylinder, said means including an inlet valve operable to open and close and control the admission of said fluid to the cylinder, means for heating a substance in condensed phase, means operating in timed relation to the operation of said working fluid inlet valve and said piston and cylinder for injecting said substance in condensed phase into said working fluid at a location beyond said inlet valve in the direction of working fluid flow and after said inlet valve has opened to admit said working fluid into the cylinder, to thereby induce expansion of the working fluid and drive said piston relative to the cylinder by energy derived from the heat of said substance, and means for recovering said heated substance in condensed phase from the working fluid after said expansion and then recycling said substance back through said heating means to the cylinder.

13. A reciprocating engine including a cylinder and contained piston to be driven relative to one another by expansion of a gas within the cylinder, means for introducing said gas into the cylinder, said means including an inlet valve operable to open and then close and thereby admit a controlled charge of said gas to the cylinder, means for heating a liquid, means operating in timed relation to the operation of said gas inlet valve and said piston and cylinder for injecting said heated liquid into said gas and at a location beyond said inlet valve in the direction of gas flow and after substantially said entire charge of gas has entered the cylinder, to thereby induce expansion of the gas and drive said piston relative to the cylinder by energy derived from the heat of said liquid, means forming a closed circuit for recovering the gas after said expansion thereof and recycling it back to said cylinder, means for cooling said gas after each expansion thereof, and means for recovering said heated liquid from the gas after said expansion and then recycling said liquid back through said heating means to the cylinder.

14. A reciprocating engine including a cylinder and contained piston to be driven relative to one another by expansion of a gas within the cylinder, means for introducing said gas into the cylinder, said means including an inlet valve operable to open and then close and thereby admit a controlled charge of said gas to the cylinder, means for compressing said gas prior to said introduction thereof into the cylinder, means for heating a substance in condensed phase, and means operating in timed relation to the operation of said gas inlet valve and said piston and cylinder for injecting said substance in condensed phase into said gas at a location beyond said inlet valve in the direction of gas flow and after substantially said entire charge of gas has entered the cylinder, to thereby induce expansion of the gas and drive said piston relative to the cylinder by energy derived from the heat of said substance.

15. A reciprocating engine including a cylinder and contained piston to be driven relative to one another by expansion of gas within the cylinder, means for introducing said gas into the cylinder, said means including an inlet valve operable to open and close and control the admission of said gas to the cylinder, a second piston and cylinder mechanism operating in timed relation to said first mentioned piston and cylinder and acting to compress said gas prior to its introduction into said first mentioned cylinder, means for heating a liquid, and means operating in timed relation to the operation of said gas inlet valve and said first cylinder and piston and said second piston and cylinder mechanism, for injecting said heated liquid into said gas at a location beyond said inlet valve in the direction of gas flow and after said gas inlet valve has opened to admit said gas into said first mentioned cylinder, to thereby induce expansion of the gas and drive said piston relative to the cylinder by energy derived from the heat of said liquid.

References Cited by the Examiner

UNITED STATES PATENTS

| | | | |
|---|---|---|---|
| 84 | 11/36 | Tippett | 60—27 |
| 689,625 | 12/01 | Scharffe | 60—27 X |
| 1,390,562 | 9/21 | Kelly | 60—27 |
| 3,127,744 | 4/64 | Nettel | 60—49 |

FOREIGN PATENTS

| | | |
|---|---|---|
| 501,570 | 1/20 | France. |
| 1,277,953 | 10/61 | France. |

JULIUS E. WEST, *Primary Examiner.*

ROBERT R. BUNEVICH, *Examiner.*